Sept. 7, 1965         G. LEMESLE ETAL         3,205,143

HANDLING APPARATUS FOR GAS-COOLED NUCLEAR REACTOR INSTALLATION

Filed Sept. 30, 1963         6 Sheets-Sheet 1

United States Patent Office 3,205,143
Patented Sept. 7, 1965

3,205,143
HANDLING APPARATUS FOR GAS-COOLED NUCLEAR REACTOR INSTALLATION
Georges Lemesle and Roger Martin, Paris, Pierre Rouge, Gif-sur-Yvette, and Jean Vivien, Versailles, France, assignors to Commissariat a l'Energie Atomique, Paris, France
Filed Sept. 30, 1963, Ser. No. 312,784
Claims priority, application France, Oct. 6, 1962, 911,501
8 Claims. (Cl. 176—30)

The invention relates to a handling apparatus for an installation for reloading a heterogeneous nuclear reactor with fuel elements, the said reactor being cooled by a gas and comprising a "garret." The term "garret" is used to designate a chamber which is provided in the shield provided for biological protection and resistance to the pressure of the nuclear reactor, which is separated from the core by a wall or slab for reducing radiation, and in which there can be arranged various apparatus and more particularly a device for handling fuel elements intended for the reloading of the channels.

The provision of a garret affords a certain number of advantages to nuclear reactors, more particularly the following: the easy passage of fuel elements from the channels to the handling apparatus, a passage being provided in the slab opposite each channel; the possibility of storing irradiated fuel elements for a sufficient length of time for their activity to be sufficiently weakened to avoid the necessity of cooling during removal towards the "swimming pool"; at the cost of maintaining the temperature in the garret at a relatively low value (about 60°); the possibility of using conventional mechanisms in the garret; finally, the elimination of the heavy bulky biological protection which handling machines situated outside the shield of the reactor have to be provided with.

On the other hand, the use of a garret makes it necessary to provide mechanisms which are as simple and reliable as possible in order to limit the risk of breakdown and to make it advantageous to use driving members arranged outside the shield. Since despite all precautions it may be necessary to enter the garret in order to repair a defective machine, provision must also be made for entry into the garret. This possibility is facilitated by maintaining a slight positive pressure in the garret during normal operation in order to limit the pollution of the apparatus situated therein.

The present invention has as its object to provide a handling apparatus whose driving members are situated outside the protective envelope of the reactor and can therefore be maintained and replaced easily, connection between these members and the handling apparatus proper situated within the garret being effected by mechanical means only, which are likewise replaceable without any need to enter the garret.

For this purpose, the invention proposes a handling apparatus for an installation for reloading fuel elements into a nuclear reactor cooled by a gaseous phase and comprising a garret chamber arranged in the biological protection shield of the reactor and separated from the chamber occupied by the core by a wall having orifices therein and giving access to the channels in the core which accommodate the fuel elements, said reloading installation also comprising an apparatus for introducing into the garret containers provided with new elements and removing used elements from the garret, characterised more particularly in that the handling apparatus comprises a beam mounted in the garret to be rotatable about an axis parallel to the channels, driving means for rotatably driving the beam, an assembly movable along the beam and carrying a movable gripping device parallel to the axis of rotation of the beam, first and second driving means arranged outside the shield in a chamber connected to the garret, and first and second flexible means extending through the shield substantially along the axis of rotation of the beam and connecting the movable assembly to the first driving means and the gripping device to the second driving means respectively.

The arrangement according to the invention affords such reliability and safety that the risk of breakdown generally no longer justifies the provision of a remote-controlled mechanism for dealing with faults which is adapted to come into action when the reactor is under pressure.

In the event of a breakdown, which is extremely improbable, it is possible of course to depressurize the reactor and to introduce into the garret an armoured tracked vehicle which is occupied by an operator or remote-controlled for the removal of the irradiated fuel element cases before the entry of workmen in order to carry out the necessary repairs on the spot.

A further advantage of the solution according to the invention as compared with prior solutions consists in the possibility it affords of reproducing all the movements on a full-size scale or on a reduced scale in the free atmosphere, advantageously above the reactor: the operator from the control desk thus has a view of the operations which he is carrying out and a representation of the arrangement of the elements in the garret. The use of a reproduction apparatus although advantageous remains, however, optional, and other methods could be used in order to keep the operator informed.

The invention will be more easily understood from reading the following description of a form of embodiment given by way of non-limitative example. The de-description refers to the accompanying drawings wherein:

FIGURES 1a, 1b and 1c are partial isometric projection views of a handling apparatus according to the invention, and of a reproduction apparatus arranged outside the reactor; these figures are connected with one another in the order in which they are enumerated and show respectively the lower portion of the apparatus, the central zone of the upper portion, and the side zone of the said upper portion.

FIGURE 2 is a diagram illustrating the kinematics involved in the operation of the handling apparatus and reproduction apparatus shown in FIGURE 1.

The handling apparatus described is intended for the reloading of the channels of a nuclear reactor having a solid moderator cooled with a gaseous phase, which is provided with a garret.

Figure 1A:
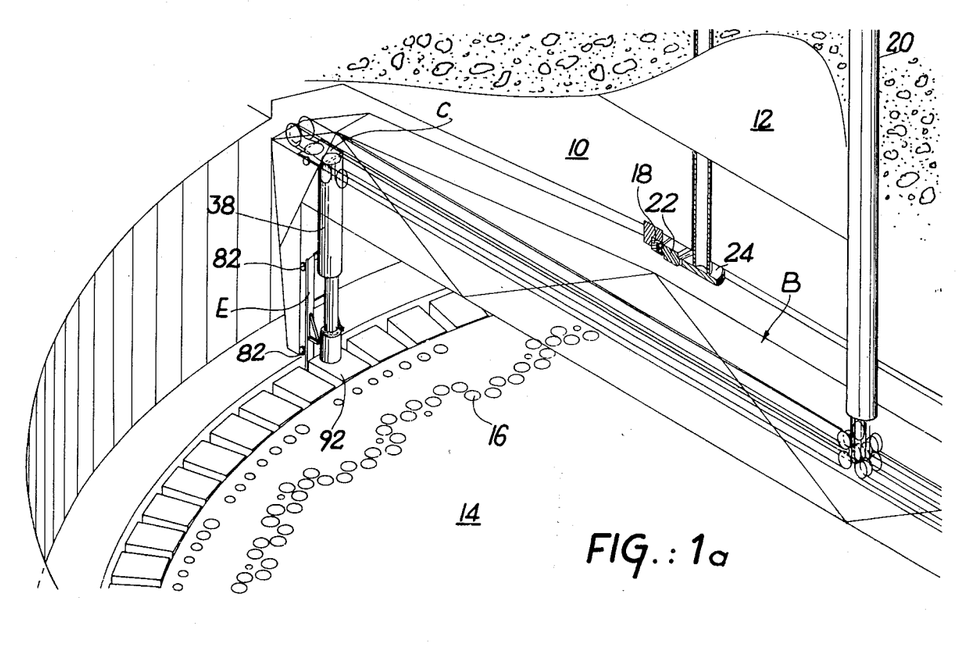
Figures 1C, 2:
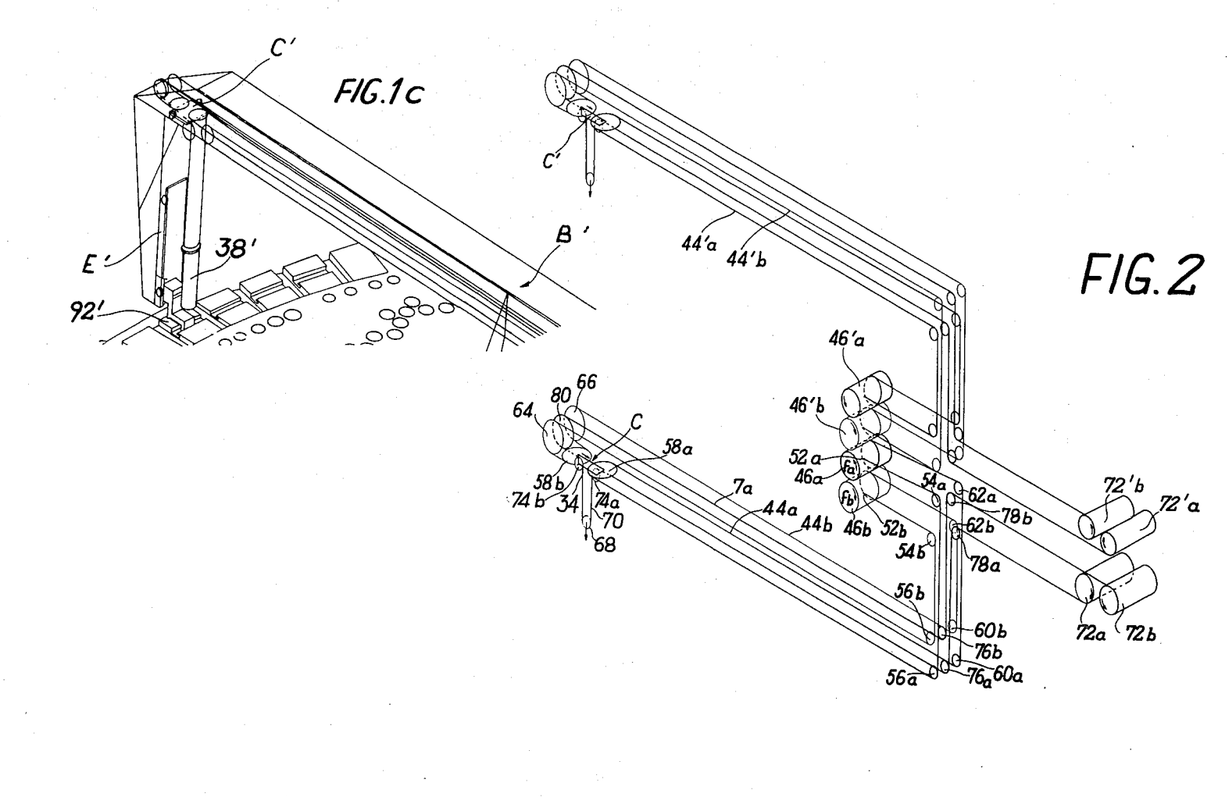

The general arrangement of the handling apparatus A is shown diagrammatically in FIGURE 1 which illustrates partially the garret 10 of the reactor which is bounded by a shield 12 and a lower slab 14 through which closable tubes such as 16 extend which give access to the channels. The handling apparatus A can be regarded as composed as follows: A beam B orientatable about the vertical axis of the garret and its driving mechanism; a carriage C displaceable along the beam and the carriage driving mechanism; a gripping device D carried by the carriage and mobile relatively to the carriage in order to enter the access tubes and the channels and the mechanism for driving this device.

These three assemblies will be described successively.

In addition to the handling apparatus A there is of course provided a system for removing used elements and introducing new elements: this system, which does not form part of the invention, will be described only very briefly. There is also a storage system provided within the garret for storing elements during the time necessary for their deactivation. This system, provided at the periphery of the garret, will also be described.

The beam B and its driving mechanism are shown in overall form in FIGURE 1. The beam B constituting the member carrying the handling apparatus, is supported at two points symmetrical with respect to the axis of rotation by an annular bearing of large diameter 18 fixed to the roof of the garret. This ball bearing can be replaced by a circular rail on which rollers carried by the beam run, or by a rolling track on which the beam rests by means of a system of circulating balls, or by any other suitable system.

The rectangular-section beam is advantageously constituted by a triangulated system of angles or section members adapted to be bolted together to permit the assembly of the beam on site. Fixed to the central portion of the beam is a vertical tube 20 concentric with the axis of rotation of the beam, which extends through the shield 12 and the function of which will be explained hereinafter.

Figure 3:
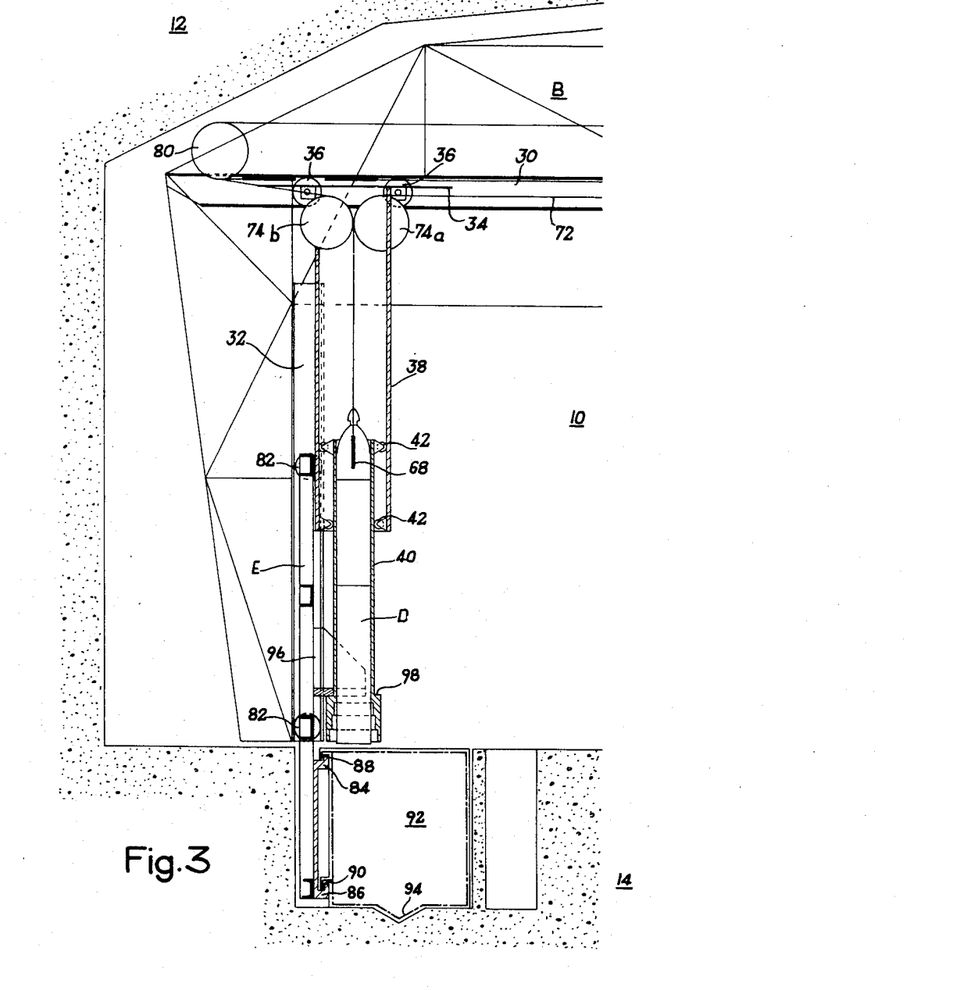
FIGURE 3 is a view of a detail, in section taken on a plane passing through the axis of the reactor and showing the carriage of the apparatus and the take-up carriage of the removing apparatus.

The carriage C is shown in FIGURE 3 whilst its control mechanism is shown especially in FIGURES 1 and 2. In fact two carriages are advantageously provided each having an independent control mechanism, one of the carriages being used normally and the other as an emergency measure in the case of a breakdown in the first. The carriages are each mobile along a half of the beam B the rotational movement of which is not limited, permitting treating any channel with any one of the carriages.

The carriage C (FIGURES 1 and 3) is composed of a chassis 34 provided with four guide wheels 36 in horizontal rails 30, to which is fixed a vertical guide tube 38 in which slides a telescopic guide tube 40 the function of which will be explained hereinafter. The guiding of the tube 40 in the tube 38 is effected for example by rollers 42.

The control mechanism for the carriage, intended to effect the translational movement of the carriage along the rails 30 of the beam, comprises two cables (one for each direction of translational movement) operated by separate driving means.

The displacement of the carriage towards the axis is effected by a first cable 44a (FIGURES 1 and 2) actuated by a winch 46a arranged outside the shield 12 in a chamber under pressure 48 (FIGURE 1) and which rotates synchronously with the beam B under the influence of the same motor 28. For this, the chamber 48 is fast with an assembly 49 resting on a ball bearing 18' and has a toothed annulus 22' identical with the annulus 22 and engaged by gearwheels 24' carried by the shafts 26.

One of the ends of the cable 44a is connected within the chamber 48 to a fixed point 52a (FIGURE 2). From there, the cable passes over a guide pulley 54 rotating on a pulley-carrying part 55 contained in the chamber 48 and fast with the upper end of the vertical tube 22, extends vertically along the tube, passes over a second guide pulley 56a carried by the central part of the beam, extends horizontally as far as a traction pulley 58a carried by the chassis of the carriage, and follows a return run in the opposite direction to the preceding as far as the winch 46a contained in the chamber 48. Along this return run the cable 44a is guided by guide pulleys 60a and 62a.

The displacement of the carriage C from the axis is effected by a second cable 44b actuated in a similar manner to the cable 44a, but provided with two supplementary pulleys 64 and 66 for change of direction through 180°, these supplementary pulleys being carried by the end of the beam B. In the figures the elements co-operating with the cable 44b and corresponding to others already described hereinbefore bear the same reference numeral but with the addition of the letter b instead of a.

The solution indicated hereinbefore consisting in bringing the ends of each cable outside the shield has the advantage, important in the present case, over other solutions (for example driving pulley and endless cable) of permitting the replacement of the cable by a simple operation which does not require entry into the garret, as will be seen hereinafter.

The winches 46a and 46b are of course arranged so that winding on one corresponds to unwinding from the other. This condition is advantageously realised by means of a coupling system using gearwheels 68a and 68b (FIGURE 1) permitting the two winches to be operated at the same time from a single motor (not shown) which can be situated outside the chamber 48. Thus when the winch 46a turns in the direction of the arrow fa and winds the cable 44a, the winch 46b rotates in the opposite direction fb and unwinds the cable 44b in order to permit the carriage to approach the axis.

The gripping device D is shown in FIGURES 1 and 3 whilst its control mechanism is more clearly visibly in FIGURE 2. This gripping device is constituted by any desired gripper whose opening and closing are controlled by inertia.

The gripper is cylindrical in general form, of such a diameter that it is guided by the telescopic tube 40. At its lower portion, the gripper has attaching members (not shown) and at its upper portion a horizontal shaft on which rotates a pulley 68 on which the gripper is suspended. The ascent of the gripper is effected under the influence of the control mechanism which will now be described, descent being effected by gravity when the control mechanism is released.

This control mechanism comprises a cable 70 controlled by the simultaneous action of two coupled winches 72a and 72b arranged in the same chamber as the winches 46a and 46b and operated in the same way by a single motor. From the pulley 68 to the winch 72a the cable 70 passes over a guide pulley 74a carried by the chassis 34, extends horizontally as far as a guide pulley 76a, carried by the central portion of the beam, follows the tube 20 and passes over a guide pulley 78a carried by the part 55. From the pulley 68 to the winch 72b, the cable passes over a guide pulley 74b similar to pulley 74a and over a pulley 80 effecting a change of direction through 180° and which is carried by the end of a beam, and then follows a path parallel to the foregoing, passing over pulleys 76b and 78b.

In order to move the gripper downwards or upwards, the winches 72a and 72b are rotated in opposite directions. The advantage of this arrangement over the arrangement of a single winch is of course that it does not cause the rotational movement of the pulley 68 which supports the weight of the gripper.

It will also be appreciated that translational movements of the carriage C do not cause any variation in the length of the cable and therefore a variation in the height of the grippers.

The beam B, the length of which is such that it comprehends all the channels which have to be unloaded and the storage area also, comes into action in the initial stage of removing fuel element containers from the storage system and in the final stage of introducing containers. By way of example, a brief description will be given with reference to FIGURE 3 of an apparatus which could, of course, be replaced by any other compatible with the handling apparatus envisaged.

It has been seen that the end portion of the beam B is provided with two vertical rails 32 for the guiding of a take-up carriage E having wheels 82 engaged in rails. When it is in the lower position, this carriage when the beam B rotates travels in a circular groove formed for this purpose in the slab 14.

The vertical-displacement carriage E comprises at its inner face two claws 84 and 86 which engage below corresponding claws 88 and 90 of fuel element receptacles which occupy the storage stations provided on the periphery of the slab 14 (FIGURE 3). One of these receptacles 92 is shown diagrammatically in dot-dash lines in FIGURE 3. Each receptacle is provided with an extension 94 like a diamond point which engages in a housing of corresponding form in the storage station in order to ensure the precise orientation of the receptacle. At the rotation of the beam B, the carriage E being in the lower position, the claws 84 and 86 come into engagement successively on the claws 88 and 90 of the receptacles 92 occupying successive storage stations. When the beam B is in a suitable orientation, it is sufficient to lift the carriage E to disengage the selected receptacle 92 from its storage station and a subsequent rotation of the beam enables the receptacle to be moved along a circular path of travel and brought opposite an outlet system provided in the wall of the shield 12.

The control of the carriage E is advantageously effected by means of the gripper D to avoid having to add a supplementary device. For this purpose, the carriage E is provided with a stirrup 96 against which a radial external shoulder 98 of the telescopic tube 40 is adapted to bear when the said tube is lifted beyond the position in which it is shown in FIGURE 3. The lifting of the tube 40 is effected by the gripper D in one or other of the two following cases:

1. When the gripper D engages a plug, of greater diameter than that of the gripper, it is centered in one of the shoulders provided for this purpose in the lower portion of the bore of the tube 40. When the gripper lifts the plug, the latter carries with it the tube 40 within the tube 38.

2. When the upper end of the gripper D comes to abut against the upper portion of the tube 40, any further lifting of the gripper causes displacement of the tube 40 to the same extent. Since the way in which the system operates will be evident, there seems no need to describe it in detail.

The system for removing storage receptacles which has just been described and requires vertical disengagement of the receptacles can be replaced by another system, for example of a type wherein the receptacles are disengaged radially. Other variants are also possible: In one of them which will be described hereinafter with reference to FIGURES 4 and 5, an additional carriage is provided for displacing along the beam a receptacle with fuel elements, and to simplify exchange of elements between channel and receptacle.

The receptacle 92 shown by way of example in FIGURE 3 is adapted to contain six fuel elements in two rows of three. When these receptacles are stored their upper face is level with the upper face of the slab 14.

A brief description will now be given of the way in which the apparatus operates when reloading a channel, i.e., replacing used fuel elements extracted from this channel by new fuel elements taken from the receptacles 92.

By a suitable displacement of the beam B and the carriage C the gripper D is brought opposite the channel which is to be dealt with. The gripper is then lowered in order to engage the first plug from the corresponding tube 16, and then raised to disengage this plug. The carriage C and possibly the beam D are again actuated to bring the plug suspended on the gripper opposite a storage station in which the plug is deposited. The operation is repeated for removing and storing the other plugs. Then the gripper is returned opposite the channel into which it is lowered to engage a fuel element and then raised again with this fuel element which is centered in the telescopic guide tube 40. The carriage C, and possibly the beam B, are then again actuated to bring the fuel element opposite an empty cell of a receptacle 92 where the element is deposited. This operation is repeated as many times as is necessary for emptying the channel.

The channel is then reloaded by a reverse process to that which has just been described, either with new elements taken from a filled receptacle previously introduced into the garret and deposited on a specific storage station, or partially with elements which have already spent a first period in the reactor; once the channel is reloaded the gripper takes up the plugs again and replaces them.

In order to discharge a receptacle 92, the beam B is orientated to the receptacle to be removed so that the claws 84 and 86 engage below the corresponding claws 88 and 90 of the receptacle. During this operation the gripper D and the tube 40 are of course retained by the cable 70 in the arrangement shown in FIGURE 3. The gripper is then lifted over a sufficient height to completely free the receptacle 92, and then the beam B is re-orientated to opposite a discharge air lock. The receptacle is then deposited by lowering the gripper D on a discharge carriage and the beam B is moved laterally to free the claws 84 and 86.

The reverse operation is of course carried out in order to deposit on a storage station a receptacle filled with new elements which has been introduced into the garret through the air lock.

In the apparatus which has just been described, the fuel element receptacles remain in their storage station during the operations involved in exchanging elements between a channel and the receptacles. In order to accelerate the rate of reloading, it is possible to use a modified form of embodiment in which the receptacles can be brought opposite the channel on which the gripper is working. This solution is shown diagrammatically in FIGURES 4 and 5 which will now be described. For the sake of greater simplicity, elements similar to those used in the form of embodiment of FIGURES 1 to 3 are designated by the same reference numeral, and the driving devices are indicated only in FIGURE 4.

Figure 5:
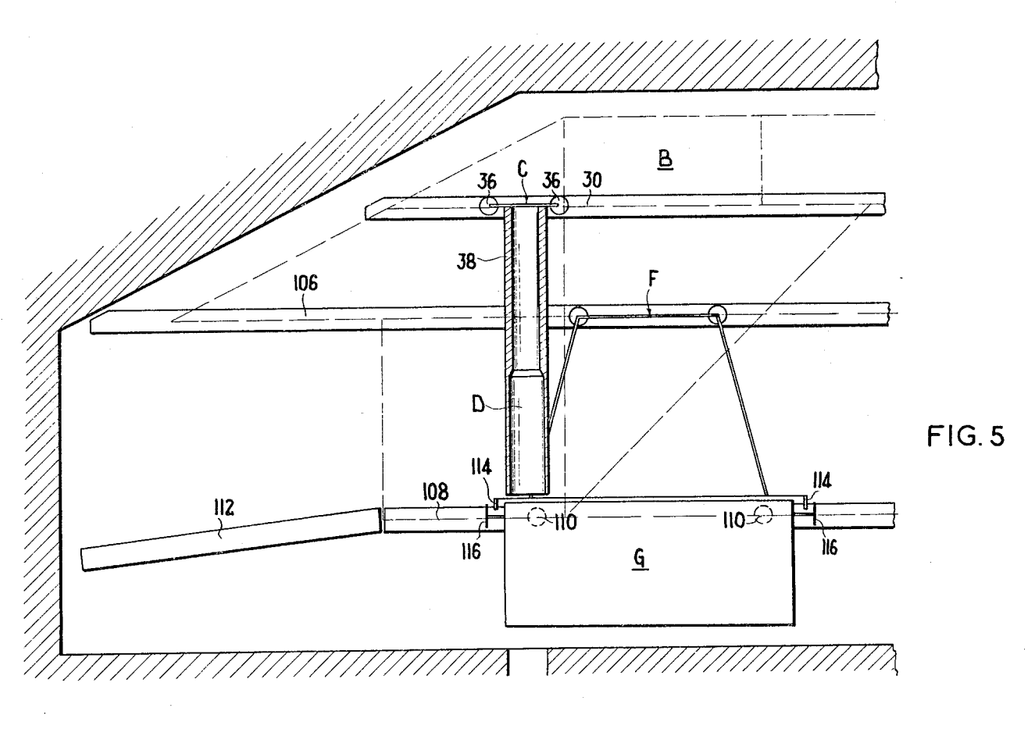
FIGURE 5 is a sectional view taken on a plane passing through the axis of the beam, of the variant whose kinematic diagram is given in FIGURE 2.

Instead of a single pair of horizontal guide rails 30, the beam B comprises three pairs of rails 30, 106 and 108 (FIGURE 5). The take-up carriage E of the preceding form of embodiment is dispensed with, and also of course the vertical rails 32.

The carriage C similar to that used in the preceding solution is mobile on the upper rails 30; the only essential difference resides in the elimination of the internal telescopic tube 40, the external fixed tube 38 (the length of which is reduced to the height of the gripper-fuel element assembly) acting as a guide tube.

Movable on the central rails 106 is an entrainment carriage F intended to move the fuel element receptacles G between their storage station and any desired point on the beam. The control system for this carriage will be described hereinafter.

Movable on the lower rails 108 are the receptacles G which for this purpose are provided with wheels 110. These receptacles are advantageously provided with a single row of cells for receiving fuel elements, situated in such a manner that the gripper D can come opposite each of the cells without any need to provide a movement transversely to the beam. The end cells have no bottom wall and can be used as guides for the descent of the gripper into the channels. Several special receptacles are also provided which have only one guide cell and cells intended to receive the plugs, faulty fuel elements and possibly half-used fuel elements which are to be put back into a channel.

Each of the storage stations is constituted by rails 112 (FIGURE 5) having the same spacing as the rails 108 and slightly inclined to avoid the displacement of the receptacles. The acceptance and entrainment of the receptacles are effected by the engagement of claws 114 of the carriage F in slideways 116 carried by the receptacles G. When the beam rotates, the carriage F being in its furthest position from the axis of rotation, the internal claw 114 travels along the internal slideways 116 of all the stored receptacles. In order to bring a receptacle to the beam, it is thus sufficient to make the rails 108 and 112 coincide and to displace the carriage 106 towards the axis.

As in the form of embodiment shown in FIGURES 1 to 3, there are provided two separate carriages C which each travel on one of the halves of the beam, FIGURE 5 showing the kinematic arrangement of the driving device for only one of these carriages. As against this, only a single entrainment carriage F is provided which can travel along the entire length of the beam. In order to obtain equivalent security to that provided with a system having two carriages, two identical control systems are provided, only one being shown in FIGURE 4. These two cable systems are advantageously placed on either side of the longitudinal central plane of the beam B.

The control system is similar in principle to that of the carriage C, but it comprises two symmetrical assemblies each effecting the displacement of the carriage in one direction.

The displacement of the carriage in one direction is effected by a first cable 118a actuated by a winch 120a arranged externally of the shield 12 within the chamber under pressure 48, and which rotates synchronously with the beam B.

One of the ends of the cable 118a is connected within the chamber 48 to a fixed point 122a. From there, the cable passes over a guide pulley 124a rotating on the pulley-carrying part 55, extends vertically along the tube, passes over a second guide pulley 126a carried by the central portion of the beam, extends horizontally as far as a 180°-direction-change pulley 128a carried by the end of the beam B, passes over a traction pulley 130a carried by the chassis of the carriage, and follows a return path in the opposite direction to the preceding path as far as the winch 120a. Over this return run the cable 118a is guided by guide pulleys 132a, 134a and 136a.

The displacement of the carriage C in the opposite direction is effected by a second cable 118b actuated similarly to the cable 118a. In the figures, the elements co-operating with the cable 118a and corresponding to others already described hereinbefore are given the same reference numeral with the addition of the reference letter b instead of a.

This variant has the advantage of facilitating operations which may be necessary in order to deal with breakdowns. In fact it is always possible to displace the receptacles G, in the event of a fault in their entrainment system, by means of one or other of the carriages C, inserting in one of their cells the gripper D which then forms a driving punch. By means of this same gripper it is always possible to replace in a channel the irradiated fuel elements which are situated in the garret, in order to permit operators to enter the said garret. This makes it possible to dispense with providing an armoured tracklaying vehicle for this operation.

*Reproduction system*

The apparatus according to the invention is advantageously provided with a reproduction system in the free atmosphere which permits visualising above the reactor all or some of the main movements of the apparatus contained in the garret, more particularly:

(1) The angular positioning of the beam B;
(2) The position of the carriage C on the beam B;
(3) The vertical positioning of the gripper D;
(4) In the variant shown in FIGURES 4 and 5, the positioning of the entrainment carriage for the receptacles;
(5) Furthermore, the reproduction system can indicate the positions of the receptacles and their filling situation;
(6) Reproduction of the operations of removing and introducing receptacles.

In the form of embodiment illustrated, the functions 1 to 3 and 5 and 6 are shown embodied, but it will be apparent that it would be possible to simplify the system by accepting a less complete visualisation. Certain reproductions are effected on their true scale (particularly angular orientations), and others on a small scale (particularly vertical displacements) in order to limit bulkiness and to permit an overall picture to be obtained.

The system comprises essentially a series of members similar to the corresponding members of the handling apparatus and designated in the figures by the same reference numerals with the addition of a prime.

The angular positioning of the beam B is reproduced by a beam B' (FIGURE 1) carried by the assembly 49 with which it rotates. This beam carries two horizontal rails 30' and two vertical rails 32'. The synchronisation of the rotational movements of the beams B and B' simply means that the actions in the transmission line are in the same sense, and therefore that the shafts 26 are driving shafts for both annuli 22 and 22'.

The positioning of the carriage C is reproduced on its true scale by a carriage c' mobile on the rails 30' of the beam B'. The entrainment of the carriage C is effected by means of two winches 46a and 46b situated outside the shield, and therefore it is sufficient to couple these winches to two other winches 46'a and 46'b situated in the free atmosphere outside the chamber 48, by means of gearwheels 68'a and 68'b. These winches drive cables 44'a and 44'b guided by pulleys arranged similarly to the arrangement of the guide pulleys of the cables 44a and 44b (FIGURE 3).

The values of the geometric quantities, masses and forces being the same, an excellent standard of accuracy in reproduction can be obtained. In order to control operations and to increase their rapidity, electrical end of travel switches can be operated on an adjoining rail.

The vertical displacements of the gripper are reproduced on a reduced scale by a gripper D' and also of course the displacements of the carriage E' which it drives. In the example illustrated a reduction to 1/20 has been made for the reasons given hereinbefore. Entrainment of the gripper D' is effected by the same driving member as that of the gripper D by means of winches 72'a and 72'b (FIGURE 3) situated in the free atmosphere, regulating the free length of a cable 70' the arrangement of which is opposite to that of the cable 70, . .'. are coupled mechanically to the winch 72a and 72b by means not shown here (gear train for example).

In order to reduce the vertical displacements in the ratio of 1/20, it is possible to use either identical winches and a reduction gear, or winches having different winding diameters. The dummy gripper D' which carries for example a core of soft iron instead of attaching elements, is displaced in a tube 38' about which electromagnets are situated which are distributed vertically at intervals equal to 1/20 of the height of a fuel element. (A counterweight, equal in mass to that of the gripper-fuel element assembly, ensures the tensioning of the cable.)

By means of this system, the position of the gripper D in a reactor channel or a tube communicating with a channel can be recognised at any moment; sending this information to a general control desk enables the operations of loading and unloading to be followed and controlled whilst they are being carried out. It is also possible to provide in the garret television cameras transmitting to receiving sets at the control desk images enabling the controller to check the correct engagement of the fuel elements and the correct operation of the apparatus. This desk can also be carried by the carriage C' in order to enable the operator to follow operations.

As has already been noted, the functions of the reproduction system need not necessarily be limited to the handling apparatus. More particularly, the form of embodiment illustrated reproduces the positioning of the receptacles 92 and the operations of removing and introducing which are carried out by the carriage E. For this purpose, a floor 14' is provided the arrangement of which in plan reproduces that of the upper face of the slab 14, and in a series of storage stations plates 92' are arranged representing the receptacles 92 and situated opposite the said receptacles.

When the tube 38' is put in position above one of the loading holes in a plate 92', it is possible to represent the loading state of the receptacle by means of an electric or electromagnet system indicating whether the cells are empty or full of new or irradiated fuel elements.

The storage positions of the plugs and, where appropriate, of the fuel elements returning into the channel from which they were extracted for a second period of dwell, can be shown in the same way.

The reproduction of the final phase of bringing receptacles 92 filled with new fuel elements to their storage station and the initial phase of removal is effected by the carriage E', the position of which relatively to the plates 92' reproduces that of the carriage E relatively to the receptacles 92; thus, each time the carriage E engages a receptacle, lifts it from its storage station and brings it opposite the air lock, the carriage E' acts on the corresponding plate 92' and deposits it on a carriage 104 (FIGURE 1) permitting the simulation of the removal operation by storing the plates on an area provided in the vicinity for this purpose.

Figure 4:
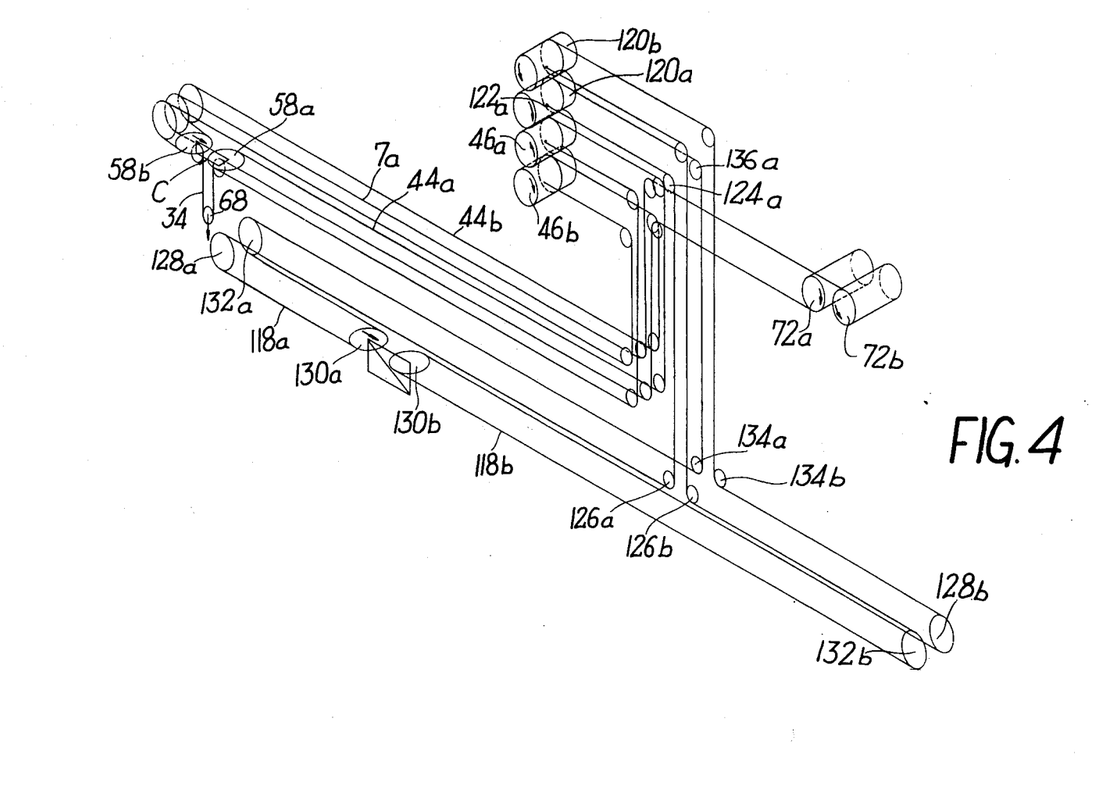
FIGURE 4, similar to FIGURE 2, is a diagram illustrating the kinematics of a variant of the invention.

The variant shown in FIGURES 4 and 5 may of course be provided with a system for reproducing the displacements of the additional elements which it comprises, essentially the carriage F. This reproduction can be carried out in accordance with the same principle as that for the movements of the carriage C, by means of an external carriage to which there will simply be permanently fixed a dummy receptacle having horizontal dimensions equal to those of the receptacle G. On this dummy receptacle, the state of filling can be shown electrically. During the operations of bringing a filled receptacle G to a storage station, the dummy receptacle will reproduce exactly the movements of the said filled receptacle. The representation of the state of filling of the stored receptacle G will be effected by electrical transmission of data from the dummy receptacle on the selected storage position. The removal of the receptacles during the phase in which the beam B is operated will produce a similar representation.

The apparatus according to the invention comprises substantially only two types of members capable of breakdown and of undergoing wear: the gripper and the cables.

The most frequent fault consists in incorrect operation of the gripper: a neat solution to this problem consists in the use of a gripper of a type permitting the remote replacement of the part comprising mobile members.

Wear on the cables requires them to be periodically changed before they have a chance to break, but the apparatus which has just been described makes this operation simple by permitting replacement under pressure in the following way (it will be remembered that all the ends of the cables are situated above the shield 12 within the sealing-tight chamber 48): a temporary sealing-tightness is effected, with recovery of leakages of gas, on each run of cable to be changed, and then the sealing-tight chamber is opened, the new cable wound on a winch is fixed to one of the ends of the cable to be changed. The chamber is again subjected to the garret pressure, the sealing-tight effect at the cable is eliminated, and cable transfer is effected by completely winding the used cable on its winch. Then sealing-tightness is again provided, this time on the runs of the new cable, the chamber 48 is opened, the old winch (on which the worn cable is wound) is replaced. The free end of the new cable is fixed by the new winch, and the sealing-tight chamber is closed again.

The system is then ready to operate again after subjecting the chamber to pressure again and discontinuing the sealing effect.

It will be apparent that the forms of embodiment which have just been described are not exclusive. It should be noted that the handling apparatus A can be used in conjunction with storage apparatus and removing apparatus different from those described here. More particularly, the storage device may not be of the fixed-station but of a mobile-station type. It should be understood that the scope of the present patent application extends to variants of all or some of the apparatus described here which remain within the scope of mechanical equivalents.

What we claim is:

1. Handling apparatus for an installation for reloading fuel elements in a nuclear reactor cooled by a gas having a core and a garret above the core within a biological protection shield comprising a beam mounted rotatably about an axis in said garret, a wall separating said core and said garret reducing the radiation from said core, orifices in said wall for access to channels arranged in said core parallel to said axis and accommodating the fuel elements, means for rotating said beam about said axis, an assembly movable along said beam, a gripping device on said assembly movable parallel to the axis of rotation of said beam, a chamber above and connected to said garret outside of said shield and rotatable with said beam, first and second driving means in said chamber and first and second flexible means extending substantially on the axis of rotation of said beam and connecting said movable assembly to said first driving means and connecting said gripping device to said second driving means, respectively.

2. Handling apparatus as described in claim 1, said first driving means comprising two coupled winches, each of said winches receiving an end of one of two cables constituting said first flexible means, the other end of each of said cables being connected to a fixed point within said chamber and each of said cables passing over a traction pulley carried by said assembly subjecting said cables to a change of direction of 180° and over guide pulleys mounted on said beam.

3. Handling apparatus as described in claim 1, said second driving means comprising two coupled winches each of which receives one end of a single cable constituting said second flexible driving means, a pulley mounted on said gripping device and supported by said single cable, guide pulleys guiding said single cable between said pulley and said winches, the coupling of said winches causing displacement of said gripping device without rotation of said pulley.

4. Handling apparatus as described in claim 2, said chamber being connected to said beam by a tubular member concentric with the axis of rotation of said beam, said cables passing through said tubular member.

5. Handling apparatus as described in claim 2 including motors for said winches mounted outside of said chamber.

6. Handling apparatus as described in claim 1 including a reproduction system outside the reactor, said reproduction system including a second beam secured to said chamber and reproducing the movement of said first beam.

7. Handling apparatus as described in claim 6, said reproduction system comprising a second movable assembly on said second beam, second driving means outside said chamber for operating said second assembly, said second driving means being coupled to said first driving means whereby said two assemblies are subjected to similar proportional displacements.

8. Handling apparatus as described in claim 6, said reproduction system including a member corresponding to said gripping device, third driving means outside of said chamber for actuating said corresponding member coupled to said second driving means whereby said corresponding member and said gripping device are subjected to similar proportional displacements.

References Cited by the Examiner

UNITED STATES PATENTS 3,066,089  11/62  Davies ______________ 176—30

FOREIGN PATENTS 927,782  6/63  Great Britain.

CARL D. QUARFORTH, *Primary Examiner.*
REUBEN EPSTEIN, *Examiner.*